United States Patent Office 3,705,922
Patented Dec. 12, 1972

3,705,922
PROCESS FOR THE PREPARATION OF GLYOXYLIC ACID METHYL HEMIACETAL
Robert H. Callighan, Penn Hills Township, Allegheny County, and Philip X. Masciantonio, Penn Township, Westmoreland County, Pa., assignors to United States Steel Corporation
No Drawing. Filed Aug. 11, 1970, Ser. No. 63,006
Int. Cl. C07c 59/22
U.S. Cl. 260—535 R                8 Claims

ABSTRACT OF THE DISCLOSURE

This invention relates to an improved process for obtaining essentially quantitative yields of glyoxylic acid methyl hemiacetal by ozonolysis of maleic acid in methanol, followed by catalytic hydrogenation of the ozonolysis products. The hemiacetal may then be readily hydrolyzed to produce glyoxylic acid monohydrate.

BACKGROUND OF THE INVENTION

Known methods for the preparation of glyoxylic acid are characterized by inconsistency of results, low yields, and/or failure to isolate the product except by the formation of insoluble derivatives. The first experiment on the preparation of glyoxylic acid by ozonation of maleic acid dissolved in water was apparently carried out by Harries (Ber. 36, 1935 (1903)) but his yield was poor and he was able to isolate the product only as the phenylhydrazone. Black et al. (Ind. Eng. Chem. Prod. Res. Develop., 5, 350 (1966)) ozonized maleic acid in water and obtained only a 50 percent yield of glyoxylic acid. Pappas et al. (British Pat. 1,092,615) ozonized maleic acid in methanol at −50° C., reduced the active oxygen with dimethyl sulfide, and obtained glyoxylic acid in 91 percent yield; however, they were unable to separate the glyoxylic acid from the dimethyl sulfoxide. The yield was determined by the formation of an insoluble derivative (2,4-dinitrophenyl-hydrazine).

Processes for the preparation of aldehydes by ozonolysis and catalytic hydrogenation of the ozonolysis products have been characterized by very poor yields. Pryde et al. (U.S. Pat. 3,112,329) teach the addition of a minor amount of pyridine (8–12 percent) to a methanol (20 percent) -ethyl acetate (80 percent) solvent for the reduction of the ozonolysis products to improve the aldehyde yield. However, pyridine is toxic, has an offensive odor, and the improvement was not substantial. Moore (U.S. Pat. 3,349,106) teaches the use of a solvent mixture consisting of an equal mixture of an aliphatic alcohol and an aliphatic acid to obtain high yields of aldehydes after ozonolysis and catalytic reduction. However, an elaborate isolation technique is necessary, and recovery of the solvent mixture is difficult if not impossible.

Of the many processes for the ozonolysis of maleic acid disclosed in the literature, none is feasible for one or more of the following reasons; i.e., giving low yields, requiring expensive reducing agents, requiring special or elaborate reaction conditions and, of most importance, teaching no practicable way of separating the product glyoxylic acid from the co-products of the reaction.

Therefore, it is an object of our invention to provide an efficient process for the preparation of glyoxylic acid.
An additional object is to provide a process for the preparation of glyoxylic acid where the product acid and solvent are easily separated from the reaction mixture.
It is a further object of this invention to provide a catalyst useful in the preparation of glyoxylic acid methyl hemiacetal.

SUMMARY OF THE INVENTION

We have developed an improved ozonolysis process for the production of glyoxylic acid. In our improved process, catalytic hydrogenation at atmospheric pressure is used to reduce a hydroperoxide intermediate that forms during the ozonolysis of maleic acid. The maleic acid to be used may be prepared from maleic anhydride. The acid is then dissolved in methanol and the methanol solution is treated with ozone to yield a 1 to 1 molar ratio of glyoxylic acid methyl hemiacetal and an intermediate hydroperoxide. To reduce the hydroperoxide to the hemiacetal, the reaction mixture is hydrogenated at atmospheric pressure and low temperature (<15° C.) using a palladium-on-alumina catalyst. The catalyst is then removed by filtration and the solvent is evaporated to yield glyoxylic acid methyl hemiacetal in 95 percent yield. The hemiacetal is then hydrolyzed by water to yield glyoxylic acid monohydrate.

DETAILED DESCRIPTION

We have found that when a solution of maleic acid in a low molecular weight aliphatic alcohol is treated with ozone, a solution containing a hydroperoxide results. Ideally, the solvolytic ozonolysis of maleic acid can be represented by the following equation.

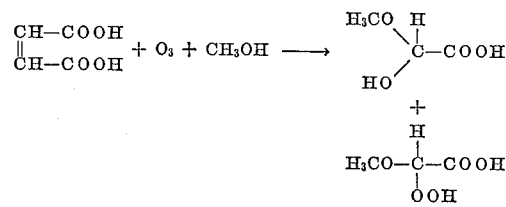

This reaction may also be represented as occurring in two steps.

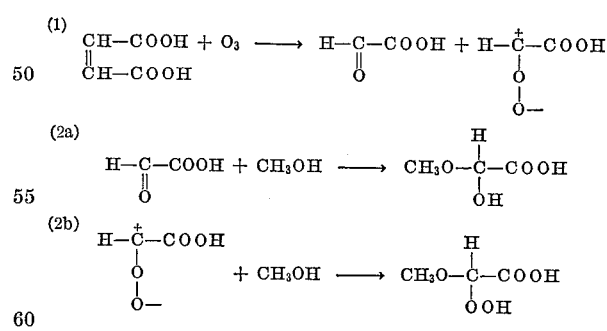

The theoretical amount of ozone required is one molecular equivalent; however, ozone absorption is not quantitative, and some unreacted ozone escapes during the reaction. We prefer to use from about 1 to about 1.5 molecular equivalents with 1.1 molecular equivalents of ozone being most preferable. Larger amounts can be used, but they offer no advantage as long as the maleic acid has completely reacted. The ozone may be generated from any convenient source, such as a commercially available ozonator. The amount of solvent used is not critical, but it should be sufficient to completely dissolve the maleic acid. We prefer to use from about 1 to about 20 parts solvent per part of maleic acid. The reaction temperature is critical and should not exceed about 10° C. Low temperatures down to about −50° C. and be used, but they offer no particular advantage, and at higher temperatures, decomposition of the intermediates becomes a significant factor. We prefer to run the ozonolysis of from about −5 to about 5° C.

The choice of solvent for the ozonolysis is important. When a non-participating solvent such as acetone is used, the improved results of our invention are not obtained. The solvents utilized in our invention are participating solvents, (i.e., they enter into the reaction) which, however, have substantially no reaction with ozone relative to the solute under the ozonization conditions. Suitable solvents for our process are the lower aliphatic alcohols such as methanol, ethanol, propanol, butanol, 2-methoxy ethanol; glycols; and aliphatic carboxylic acids containing 1 to 12 carbon atoms. Methanol is preferred.

Hydrogenation of the hydroperoxide, yielding glyoxylic acid methyl hemiacetal proceeds as follows:

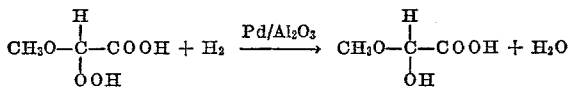

Catalytic factors are of prime importance in the hydrogenation reaction. These factors are: (1) Choice of catalyst support, (2) The amount of palladium in the catalyst, and (3) The catalyst to maleic acid ratio. We have determined that best results are obtained by using an alumina catalyst support. Other supports, such as carbon, resulted in lower yields. The amount of palladium in the catalyst should be from about 0.5 to about 10 weight percent with about 5 weight percent being preferred. The amount of catalyst based on maleic acid feed should be at least 1 weight percent, with about 5 weight percent being preferred. Amounts greater than 5 weight percent, up to about 10 weight percent could be used but offer no advantages.

The amount of hydrogen used to decompose the hydroperoxide can be varied from one molecular equivalent to almost any large excess, but there is no advantage in using more than one equivalent. We prefer to use only enough hydrogen to completely destroy the hydroperoxide. The reduction of the hydroperoxide is exothermic and should preferably be conducted at about 5° C. adding the hydrogen gas in such a manner that the temperature does not rise above about 15° C. When sufficient hydrogen has been added to completely reduce the hydroperoxide, the reaction is no longer exothermic, and continued addition will not cause a rise in temperature. During the reduction, the hydrogen is oxidized to water, which is the co-product of the reduction.

After reduction, the glyoxylic acid methyl hemiacetal is isolated by filtering the catalyst and removing the solvent by evaporation or distillation. If it is desired to obtain glyoxylic acid monohydrate, the hemiacetal is treated with an excess of water and the resulting solution evaporated.

Our invention is illustrated by the following examples without however being limited to them. We intend to cover all embodiments within the spirit of our invention as defined by the claims appended to this specification.

EXAMPLE 1

Maleic anhydride (9.8 g., 0.1 mole) was hydrolyzed by heating on a steam bath with 10 ml. of water for about 15 minutes. The solution was diluted with 200 ml. of methanol, transferred into a reactor, and cooled in an ice-water bath (5° C.). The vigorously stirred solution was then sparged with 6 weight percent ozone in oxygen at a flow rate of about 0.6 liter per minute for 1 hour and 50 minutes. Under these conditions, 5.3 g. (0.11 mole) of ozone passed into the solution. The ozone absorption was not quantitative and a small amount escaped unabsorbed throughout the reaction. After sweeping with oxygen for 10 minutes, the system was flushed with nitrogen, and 0.5 g. of 5 percent palladium-on-alumina catalyst was added. While still cool (5° C.), hydrogen gas was bubbled into the vigorously stirred solution for 30 minutes. An exothermic reaction occurred, and the temperature rose to 13° C. in 20 minutes and then dropped to 5° C. after 30 minutes. The solution gave a negative test for peroxides (starch-iodide paper) at this time. The catalyst was removed by filtration and the colorless filtrate transferred into a 1-liter flask. The methanol was then removed on a rotary evaporator under reduced pressure at about 50° C. There was obtained 20.24 g. (95.5% yield) of glyoxylic acid methyl hemiacetal. The infrared spectrum showed absorption at $2.9\mu$ (OH), $5.75\mu$ (C=O), and $9.0\mu$ (C—O—C). If desired, the hemiacetal can be dissolved in an excess of water, say 2 to 20 parts water per part of hemiacetal, and re-evaporated to yield glyoxylic acid monohydrate.

EXAMPLE 2

This example shows that the use of less catalyst gives a lower yield. The procedure of Example 1 is repeated except that 0.2 g. of 5 percent palladium-on-alumina catalyst was used. The reduction required 80 minutes to obtain a negative test for peroxides. After work-up, there is obtained 17.52 g. (86.6% yield) of glyoxylic acid methyl hemiacetal.

EXAMPLE 3

This example shows that a different catalyst support also gives a lower yield. The procedure of Example 1 was repeated except that 0.2 g. of 1 percent palladium-on-carbon was used. There was no exothermic reaction, and after adding hydrogen gas for 2 hours, the solution was still peroxidic. After work-up, there is obtained 11.68 g. (55% yield) of glyoxylic acid methyl hemiacetal.

EXAMPLE 4

This example shows that non-participating solvents are unsatisfactory. The procedure of Example 1 was repeated except that the methanol was replaced with acetone. There was no exotherm during the addition of hydrogen gas, and the solution was still peroxidic after 4 hours. After work-up, there is obtained 11.68 g. (66.5% yield) of glyoxylic acid monohydrate.

We claim:
1. A process for the preparation of glyoxylic acid methyl hemiacetal comprising:
   (a) dissolving maleic acid in methanol;
   (b) reacting, at a temperature below about 10° C., said dissolved maleic acid with an excess of ozone to yield equimolar amounts of glyoxylic acid methyl hemiacetal and glyoxylic acid methyl hydroperoxide;
   (c) hydrogenating, at a temperature below about 15° C., said hydroperoxide over a palladium-on-alumina catalyst to yield additional amounts of glyoxylic acid methyl hemiacetal;
   (d) filtering to remove the catalyst; and
   (e) separating the product hemiacetal from the solvent.
2. The process of claim 1 wherein the ozonolysis is conducted at from −5° C. to about 5° C.
3. The process of claim 1 wherein the amount of catalyst based on maleic acid feed is above about 5 weight percent.
4. The process of claim 1 wherein the amount of catalyst based on the maleic acid feed is about 5 weight percent and the catalyst contains about 5 weight percent palladium.

5. The process of claim 1 wherein the hydrogenation takes place at a temperature below about 15° C.

6. The process of claim 1 wherein about 1.1 molecular equivalents of ozone are reacted with each equivalent of maleic acid.

7. The process of claim 1 wherein the catalyst contains above about 1 weight percent palladium.

8. A process for the preparation of glyoxylic acid monohydrate comprising reacting the product of the process of claim 1 with an excess of water and evaporating the excess water.

References Cited

UNITED STATES PATENTS 3,112,329  11/1963  Pryde et al. _____ 260—535 R
3,349,106  10/1967  Moore _____ 260—535 R LORRAINE A. WEINBERGER, Primary Examiner P. J. KILLOS, Assistant Examiner U.S. Cl. X.R.

260—526 R